US008116433B2

(12) United States Patent
Pavel et al.

(10) Patent No.: US 8,116,433 B2
(45) Date of Patent: Feb. 14, 2012

(54) CALLS PER SECOND NETWORK TESTING

(75) Inventors: Marius Pavel, Bucharest (RO); Partha Majumdar, Kolkata (IN)

(73) Assignee: Ixia, Calabasas, CA (US)

( * ) Notice: Subject to any disclaimer, the term of this patent is extended or adjusted under 35 U.S.C. 154(b) by 198 days.

(21) Appl. No.: 12/759,495

(22) Filed: Apr. 13, 2010

(65) Prior Publication Data

US 2011/0249808 A1    Oct. 13, 2011

(51) Int. Cl.
*H04M 1/24*    (2006.01)
*H04M 3/08*    (2006.01)
*H04M 3/22*    (2006.01)

(52) U.S. Cl. ........ 379/10.03; 379/9; 379/10.02; 379/13; 379/15.01; 379/29.01; 370/241; 370/252

(58) Field of Classification Search ................. 379/1.01, 379/9, 9.04, 9.06, 14, 10.01, 10.02, 10.03, 379/13, 15.01, 15.03, 26.01, 27.02, 27.04, 379/29.01, 29.02, 29.1, 31, 32.01; 370/241, 370/244, 245, 250, 251, 252
See application file for complete search history.

(56) References Cited

U.S. PATENT DOCUMENTS

| | | | | |
|---|---|---|---|---|
| 5,359,646 | A | * | 10/1994 | Johnson et al. ............ 379/27.02 |
| 5,479,473 | A | * | 12/1995 | Zey ................................. 379/18 |
| 5,495,470 | A | * | 2/1996 | Tyburski et al. .............. 370/248 |
| 5,568,471 | A | | 10/1996 | Hershey et al. |
| 5,577,197 | A | * | 11/1996 | Beck .............................. 714/28 |
| 5,761,272 | A | | 6/1998 | Williams |
| 5,835,565 | A | | 11/1998 | Smith |
| 5,905,713 | A | | 5/1999 | Anderson et al. |
| 5,940,472 | A | * | 8/1999 | Newman et al. ............ 379/10.02 |
| 5,974,237 | A | | 10/1999 | Shurmer et al. |
| 6,028,847 | A | | 2/2000 | Beanland |
| 6,031,528 | A | | 2/2000 | Langfahl, Jr. |
| 6,091,802 | A | | 7/2000 | Smith et al. |
| 6,108,800 | A | | 8/2000 | Asawa |
| 6,189,031 | B1 | * | 2/2001 | Badger et al. ................. 709/224 |
| 6,279,124 | B1 | | 8/2001 | Brouwer |
| 6,397,359 | B1 | | 5/2002 | Chandra et al. |
| 6,430,617 | B1 | | 8/2002 | Britt |
| 6,526,259 | B1 | | 2/2003 | Ho |

(Continued)

OTHER PUBLICATIONS

IXIA Communications, IxExplorer User's Guide, Revision 2.1.0, Nov. 1, 1999, pp. 1-384.

(Continued)

*Primary Examiner* — Binh Tieu
(74) *Attorney, Agent, or Firm* — SoCal IP Law Group LLP; Mark A. Goldstein; Steven C. Sereboff (57) ABSTRACT

Systems and methods for calls per second network testing are disclosed. The methods may be performed by a network testing system or other computing device. The method may include receiving user selection to create a network test. A user specification of a bulk network calls test type and the call transmission criteria for the network test are received. The call transmission criteria may include a number of calls per second and one of either a talk time or a number of channels. When the talk time is specified, the number of channels is calculated. Similarly, when the number of channels is specified, the talk time is calculated. User selection to begin the network test is received, and packets are transmitted for the network test according to the call transmission criteria. During transmission, the call transmission criteria are recalculated at a system defined interval to avoid bursts.

20 Claims, 3 Drawing Sheets

U.S. PATENT DOCUMENTS

| | | | |
|---|---|---|---|
| 6,587,543 B1 * | 7/2003 | Howard et al. | 379/10.01 |
| 6,601,020 B1 | 7/2003 | Meyers | |
| 6,775,644 B2 | 8/2004 | Myers | |
| 6,823,051 B1 * | 11/2004 | Thomas et al. | 379/112.01 |
| 6,826,259 B2 | 11/2004 | Hoffman | |
| 7,016,340 B1 * | 3/2006 | McKinion | 370/352 |
| 7,031,264 B2 | 4/2006 | Adhikari et al. | |
| 7,099,438 B2 | 8/2006 | Rancu et al. | |
| 7,313,098 B2 | 12/2007 | Bearden et al. | |
| 7,327,686 B2 | 2/2008 | Standridge | |
| 7,460,467 B1 | 12/2008 | Corcoran | |
| 2003/0202486 A1 | 10/2003 | Anton | |
| 2003/0231741 A1 | 12/2003 | Rancu et al. | |
| 2004/0003070 A1 * | 1/2004 | Fernald et al. | 709/223 |
| 2004/0008825 A1 * | 1/2004 | Seeley et al. | 379/32.01 |
| 2006/0187848 A1 | 8/2006 | Zaniolo et al. | |
| 2006/0210048 A1 * | 9/2006 | Whitehead et al. | 379/221.09 |
| 2009/0013398 A1 * | 1/2009 | Cookmeyer et al. | 726/11 |

OTHER PUBLICATIONS

IXIA Communications, The Ixia 200 Traffic Generator and Analyzer, Product Description, 199701999, last accessed on Aug. 15, 2003, file://C:/DS/IXIA/Patents/081403/ix200.htm, pp. 1-2.

* cited by examiner

CALLS PER SECOND NETWORK TESTING

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to network communications testing involving voice calls.

2. Description of the Related Art

Networks such as the Internet carry a variety of data communicated using and through a variety of network devices including servers, routers, hubs, switches, and other devices. Before placing a network into use, the network, including the network devices, network media, network segments and network applications included therein, may be tested to ensure successful operation. Network devices and applications may be tested, for example, to ensure that they function as intended, comply with supported protocols, and can withstand anticipated traffic demands. Such testing may also be performed on already deployed network devices, network segments and network applications.

To assist with the construction, installation and maintenance of networks, network applications and network devices, networks may be augmented with network analyzing devices, network conformance systems, network monitoring devices, and network traffic generators, all which are referred to herein as network testing systems. The network testing systems may allow for analyzing the performance of networks, network applications and network devices by capturing, modifying, analyzing and/or sending network communications. The network testing systems may also be used to evaluate how well a network device or network segment handles data communication, streaming media and voice communications.

DETAILED DESCRIPTION

Apparatus

Figure 1:
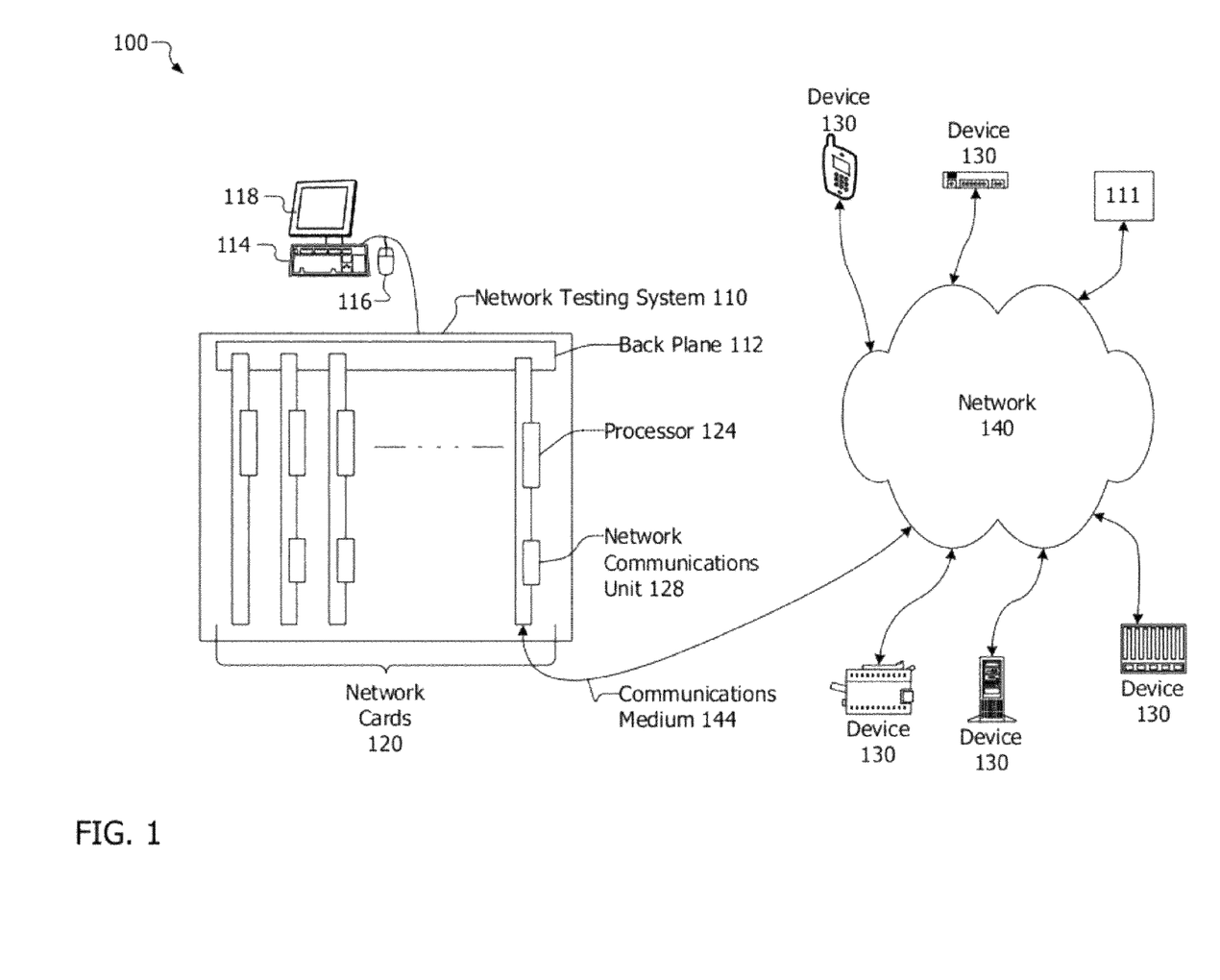
FIG. 1 is a block diagram of an environment in which calls per second network testing may be implemented.

FIG. 1 is a block diagram of an environment in which calls per second network testing may be implemented. The environment 100 shows a network testing system 110 in which methods for receiving, processing and executing network tests may be implemented. The network test may be system default tests and may be user modified or user specified. The environment 100 includes network testing system 110 coupled via at least one network card 120 to a network 140 over a communications medium 144. The network testing system 110 may include or be one or more of a performance analyzer, a conformance validation system, a network analyzer, a packet blaster, a network management system, a combination of these, and/or others.

The network testing system 110 may be used to evaluate or measure characteristics and performance of a network communication medium, a network application, a network communications device or system, including the throughput of network traffic, the number of dropped packets, jitter, packet delay, and many others. Such testing may be used to evaluate the Mean Opinion Score (MOS) or R-value score of a voice transmission, a video quality score or rating, a broadband quality score, or other similar media transmission score for a communication over a network or portion thereof and/or through a network communications device. The network testing system may be used to evaluate the performance of servers, network communications devices such as, for example, routers, gateways, firewalls, load balancers, and other network devices, as well as network applications and other software.

The network testing system 110 may be in the form of a chassis or card rack, as shown in FIG. 1, or may be an integrated unit. Alternatively, the network testing system may comprise a number of separate units such as two or more chassis cooperating to provide network analysis, network conformance testing, and other tasks. The chassis of the network testing system 110 may include one or more network cards 120 and a back plane 112. The network cards 120 may be coupled with back plane 112. One or more network cards 120 may be included in network testing system 110. The network cards 120 may be permanently installed in the network testing system 110, may be removable, or may be a combination thereof.

The network testing system 110 and/or one or more of the network cards 120 may include an operating system such as, for example, versions of Linux, Unix and Microsoft Windows.

Network card 120 is coupled with network 140 via a communications medium 144. Although a single connection over communications medium 144 is shown, each of the network cards 120 may be connected with network 140 over a communications medium. In one embodiment, the network cards may have two or more connections each over a communications medium with the network 140 and/or with multiple networks. The communications medium may be, for example, wire lines such as an Ethernet cable, fibre optic cable, and coaxial cable, and may be wireless.

The network testing system 110 and the network cards 120 may support one or more well known higher level (OSI Layers 3-7) communications standards or protocols such as, for example, one or more versions of the User Datagram Protocol (UDP), Transmission Control Protocol (TCP), Internet Protocol (IP), Internet Control Message Protocol (ICMP), Internet Group Management Protocol (IGMP), Stream Control Transmission Protocol (SCTP), Session Initiation Protocol (SIP), Hypertext Transfer Protocol (HTTP), Address Resolution Protocol (ARP), Reverse Address Resolution Protocol (RARP), File Transfer Protocol (FTP), Real-time Transport Protocol (RTP), Real-time Transport Control Protocol (RTCP), Real-Time Streaming Protocol (RTSP), the Media Gateway Control Protocol (MEGACO), the Session Description Protocol (SDP), Border Gateway Protocol (BGP), Enhanced Interior Gateway Routing Protocol (EIGRP), Multiple Spanning Tree Protocol (MSTP), Open Shortest Path First (OSPF), Protocol-Independent Multicast-Sparse Mode (PIM-SM), Intermediate System to Intermediate System (IS-IS or ISIS), Per-VLAN Spanning Tree Plus (PVST+), Rapid Per-VLAN Spanning Tree Plus (RPVST+), and Simple Mail Transfer Protocol (SMTP); may support one or more well known lower level communications standards or protocols (OSI Layers 1-2) such as, for example, the 10 and/or 40 Gigabit Ethernet standards, the Fibre Channel standards, one or more varieties of the IEEE 802 Ethernet standards, Asynchronous Transfer Mode (ATM), X.25, Integrated Services Digital Network (ISDN), token ring, frame relay, Point to Point Protocol (PPP), Fiber Distributed Data Interface (FDDI), Universal Serial Bus (USB), IEEE 1394 (also known as i.link® and Firewire®); may support proprietary protocols; and may support other protocols. Each network card 120 may support a single communications protocol, may support a number of related protocols, or may support a number or combination of related or unrelated protocols.

The term "network card" as used herein encompasses line cards, test cards, analysis cards, network line cards, load modules, interface cards, network interface cards, data interface cards, packet engine cards, service cards, smart cards, switch cards, relay access cards, CPU cards, port cards, and others.

The network cards 120 may include one or more processors 124 and one or more network communications units 128. In another embodiment, the network cards 120 may have no processors 124 and may include one or more network communications units 128. In the embodiment in which the network cards do not include a processor, processing may be performed by a processor on a motherboard of the network testing system 110, on another card, on the backplane or by a remote or external unit. When the network card 120 includes two or more network communications units 128, the network card 120 is in effect two or more network devices. That is, a network card 120 having n network communications units 128 may function as n network devices.

The network communications unit 128 may be implemented as one or more field programmable gate arrays (FPGA), application specific integrated circuits (ASIC), programmable logic devices (PLD), programmable logic arrays (PLA), other kinds of devices, and combinations of these. The network communications unit 128 may support one or more communications protocols. The network communications unit 128 may include a network interface through which the network card 120 may transmit and/or receive communications over the network 140.

The network card 120 may include and/or have access to local and/or remote memory, storage media and storage devices. Instructions to be executed by the processor 124 may be stored on and executed from a local or remote computer readable storage medium or storage device. A computer readable medium includes, for example, without limitation, magnetic media (e.g., hard disks, tape, floppy disks), optical media (e.g., CD, DVD, BLU-RAY DISCO), flash memory products (e.g., MEMORY STICK®, COMPACTFLASH® and other flash memory media), and volatile and non-volatile silicon memory products (e.g., random access memory (RAM), programmable read-only memory (PROM), electronically erasable programmable read-only memory (EEPROM), and others). A storage device is a device that allows for the reading from and/or writing to a storage medium. Storage devices include hard disk drives, magnetic tape, solid-state drives (SSDs), DVD drives, BLU-RAY DISC® drives, flash memory devices, and others.

The processor 124, network communications unit 128, and memory may be included in one or more FPGAs, PLAs, PLDs on the network card 120. Additional and fewer units, hardware and firmware may be included in the network card 120.

The back plane 112 may serve as a bus or communications medium for the network cards 120. The back plane 112 may also provide power to the network cards 120.

The network testing system 110 may have a computer (not shown) coupled thereto. The computer may be local to or remote from the network testing system 110. The network testing system 110 may have coupled therewith a display 118 and user input devices such as a keyboard 114 and a mouse 116, as well as other user input devices including, for example, pens and trackballs. The user input devices may be coupled to a network card, other card, motherboard, or backplane included in the chassis.

The network testing system 110 may be implemented in a computer such as a personal computer, server, or workstation, as well as the chassis shown. The network testing system 110 may be used alone or in conjunction with one or more other network testing systems 110. The network testing system 110 may be located physically adjacent to and/or remote to the network devices 130 in the network 140. The network testing system 110 may be used to test and evaluate the network 140 and/or portions thereof, network devices 130, applications running on network devices 130, and/or services provided by network 140 and/or network devices 130 and/or network applications. The network testing system 110, the network cards 120, and the network communications units 128 may all be network devices.

The network 140 may be a local area network (LAN), a wide area network (WAN), a storage area network (SAN), or a combination of these. The network 140 may be wired, wireless, or a combination of these. The network 140 may include or be the Internet. The network 140 may be public or private, may be a segregated test network, and may be a combination of these. The network 140 may be comprised of a single or numerous nodes providing numerous physical and logical paths for packets to travel. Each node may be a network device as described herein. A node may be a computing device, a data communications device, a network device, a network card, or other devices as defined and described herein.

Communications on the network 140 may take various forms, including frames, cells, datagrams, packets, messages, higher level logical groupings, or other units of information, all of which are referred to herein as packets. Those packets that are communicated over a network are referred to herein as network traffic. The network traffic may include packets that represent electronic mail messages, streaming media such as music (audio) and video, telephone (voice) conversations, web pages, graphics, documents, and others.

The network devices 130 may be devices capable of communicating over the network 140 and/or listening to, injecting, delaying, dropping, relaying, processing, and/or modifying network traffic on network 140. The network devices 130 may be computing devices such as computer workstations, personal computers, servers, portable computers, set-top boxes, video game systems, media players such as BLU-RAY DISC® players, personal video recorders, telephones, personal digital assistants (PDAs), computing tablets, and the like; peripheral devices such as printers, scanners, facsimile machines and the like; network capable storage devices including disk drives such as network attached storage (NAS) and SAN devices; testing equipment such as network analyzing devices, network conformance systems, emulation systems, network monitoring devices, and network traffic generators; components such as processors, network cards and network communications units; and networking devices such as routers, relays, firewalls, hubs, switches, bridges, traffic accelerators, and multiplexers. In addition, the network devices 130 may include home appliances such as refrigerators, washing machines, and the like as well as residential or commercial heating, ventilation, and air conditioning (HVAC) systems, alarm systems, may also include point of sale systems and bank teller machines, and other devices or systems capable of communicating over a network. One or more of the network devices 130 may be devices to be tested and may be referred to as devices or systems under test.

The network testing system 110 may send communications over the network 140 to a or through a network device 130. The destination of communications sent by the network testing system 110 may be a device under test such as a network device 130, may be the network testing system 110 such as a test between two network cards in the same network testing system 110, and may be a second network testing system 111. The network testing system 111 may be similar to or the same as network testing system 110. A first network card 120 in the network testing system 110 may send communications over the network 140 to a or through a network device 130 that are received by a second network card 120 in the network testing system 110 or are received by a third network card in the network testing system 111. A first network communications unit in a first network card in the first network testing system 110 may send communications over the network 140 to a second network testing system 111, and a second network communications unit the first network card in the first network testing system 110 may receive communications over the network 140 from the second network testing system 111. A first network communications unit in a first network card in the network testing system 110 may send communications over the network 140 and optionally through a network device 130 to a second network communications unit on the same network card in the same network testing system. The network testing system 110 may listen to and capture communications on the network 140.

The methods described herein may be implemented on one or more FPGAs and/or other hardware devices, such as, for example, digital logic devices. The methods described herein may be implemented as software, namely network testing software, running on a network testing system and executed by a processor, such as a processor on a network card or a processor in a network testing system. The network testing software may be stored on a volatile or nonvolatile memory device or storage medium included in or on and/or coupled with a computing device, a network testing system, a network card, or other card. The methods may be implemented on one or more network cards 120 in a single network testing system or may be implemented on one or more network cards 120 on each of two or more network testing systems.

Network tests run on network testing system 110 may test the functionality and features of network devices 130 coupled with network 140 and of applications or other software running on servers or network devices 130 coupled with network 140. In one embodiment, when testing the functionality and features of devices coupled with network 140, a first network card 120 in network testing system 110 would perform certain actions recited in FIG. 2 described below causing packets to be transmitted to a network device 130 (commonly referred to as a device under test or DUT) coupled with the network 140 and directed to, for example, the first or originating network card, to a second network card 120 or to a network card in another testing system coupled to the network.

In other embodiments, the testing environment shown in FIG. 1 may be virtualized such that some of the hardware components are implemented virtually as software.

The network testing software may provide a graphical user interface that allows users to prepare network tests, view the results of network tests, monitor network traffic, and perform other actions. The network testing software may support or provide access to tests and analysis of network traffic according to a plurality of communications protocols, including higher level and/or lower level communications protocols.

Methods

Figure 2:
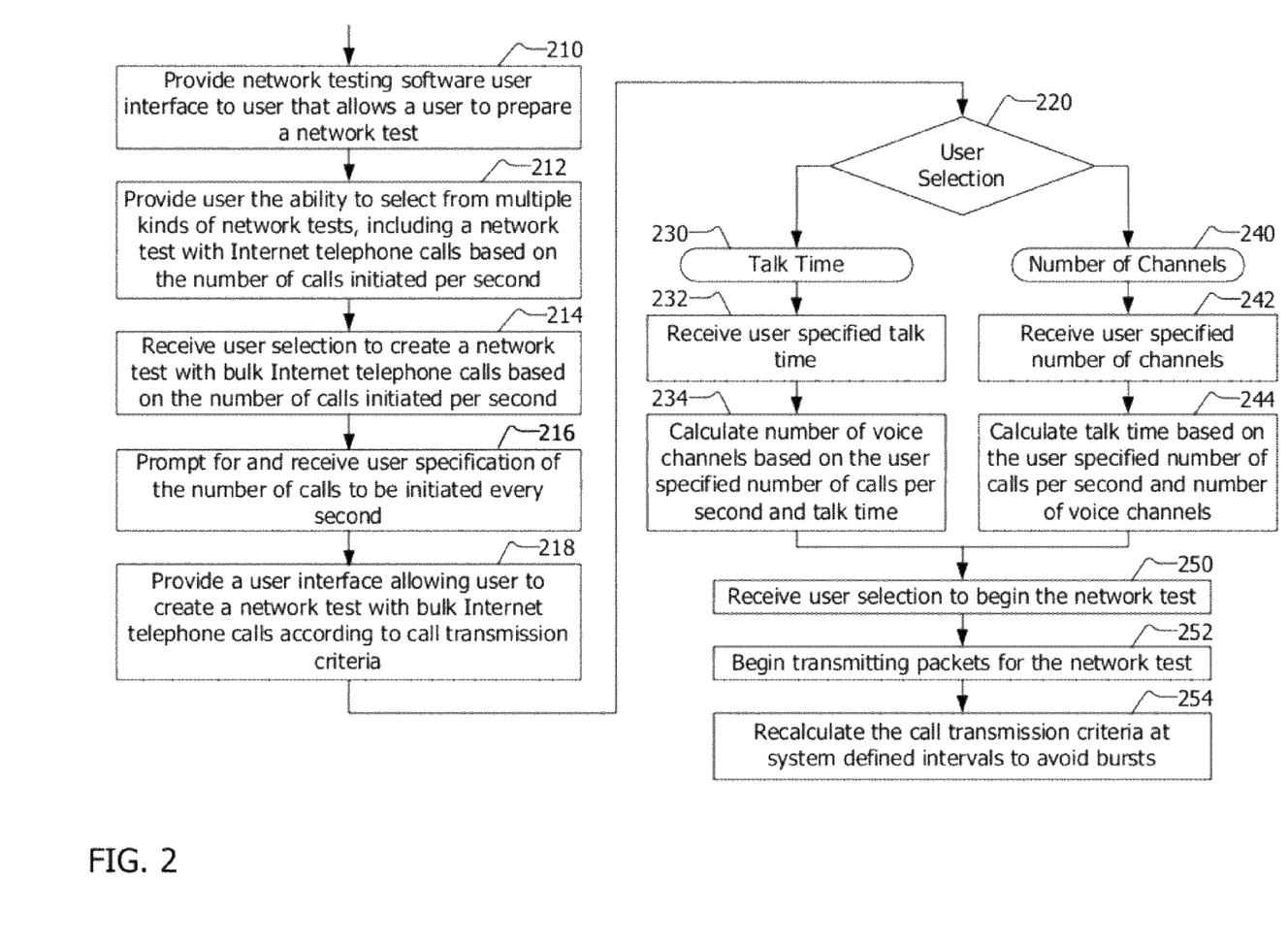
FIG. 2 is a flow chart of actions taken to implement calls per second network testing.

FIG. 2 is a flow chart of actions taken to implement calls per second network testing. As preliminary action, a network testing software user interface is provided to allow a user to prepare a network test, as shown in block 210. This is typically achieved after a user has started execution of network testing software on a network testing system or other computing device. Within the network testing software, the user may elect to prepare a network test. The network testing software provides the user the ability to select from multiple kinds of network tests, including a network test with Internet telephone calls based on the number of calls initiated per second, as shown in block 212. Pertinent to the disclosure herein, the network testing software allows the user the ability to prepare a large volume of network calls and run tests involving VOIP calls and transmissions that typically involve SIP. The calls created according to the methods described herein are evenly distributed over a relatively short period or timeframe, such as for example, over a period of 1, 10, 100, etc. milliseconds or over a period of 1, 2, 4, 5, 10, etc. seconds. In one embodiment, the calls are evenly distributed every second. For example, to achieve an objective of 100 calls per second, a call is initiated each 10 milliseconds (system defined interval). In this example, any 10 millisecond timeframe that contains over 5 initiated calls is considered a burst. For an objective of 1000 calls per second, 50 initiated calls in a 10 millisecond timeframe is considered a burst.

The network testing software receives user selection to create a network test with bulk Internet telephone calls based on the number of calls initiated per second, as shown in block 214. In response to receiving a user selection to create a network test with bulk Internet telephone calls based on the number of calls initiated per second as shown in block 214, the network testing software prompts the user for and receives the user specification of the number of calls to be initiated every second as shown in block 216. The calls initiated per second is one part of call transmission criteria, some of which are user specified and some of which are calculated by the network testing software. The network testing software then provides a user interface allowing a user to create a network test with bulk Internet telephone calls according to various call transmission criteria, as shown in block 218. In one embodiment the actions of block 216 may be included in block 218 such that the call transmission criteria for a network test with bulk calls includes the number of calls to be initiated every second.

The criteria involved in testing a VOIP or other network calling system with a multitude of calls or bulk calls include the "talk time", "number of channels", "estimated overhead time" and the "minimum inter-call duration". The talk time may be specified in milliseconds and refers to the duration between the moment a call is connected and the moment a call disconnect is initiated. When using SIP, the talk time may be computed as the time between [a] the time when an SIP ACK for an SIP INVITE is transmitted or the time when a first RTP packet is received, and [b] the time when an SIP BYE request message is sent. The number of channels is a whole number that that refers to the number of simulated voice channels to be used for achieving the desired testing rate. The estimated overhead time is computed in milliseconds by the network testing software and refers to the duration of other actions on the channel excluding the talk time and minimum inter-call duration. For example, in a typical call scenario, the estimated overhead time includes the sum of the call setup time, the call disconnect time, and any trigger operations. Triggers are used for call synchronization and are operations performed according to the applicable protocol at the occurrence of a specified event or events, or reaching a specified value or threshold. For example, in a testing environment, a trigger may be used to initiate a call disconnect after all RTP packets are sent and received by both caller and recipient. The minimum inter-call duration is computed in seconds by the network testing software and refers to the minimum time interval between the end of a call on a voice channel and the start of a new call on the same voice channel. As described in more detail below, in one embodiment, the network testing software computes the number of channels after the user enters the talk time, or the network testing software computes the talk time after the user specifies the number of channels.

Figure 3:
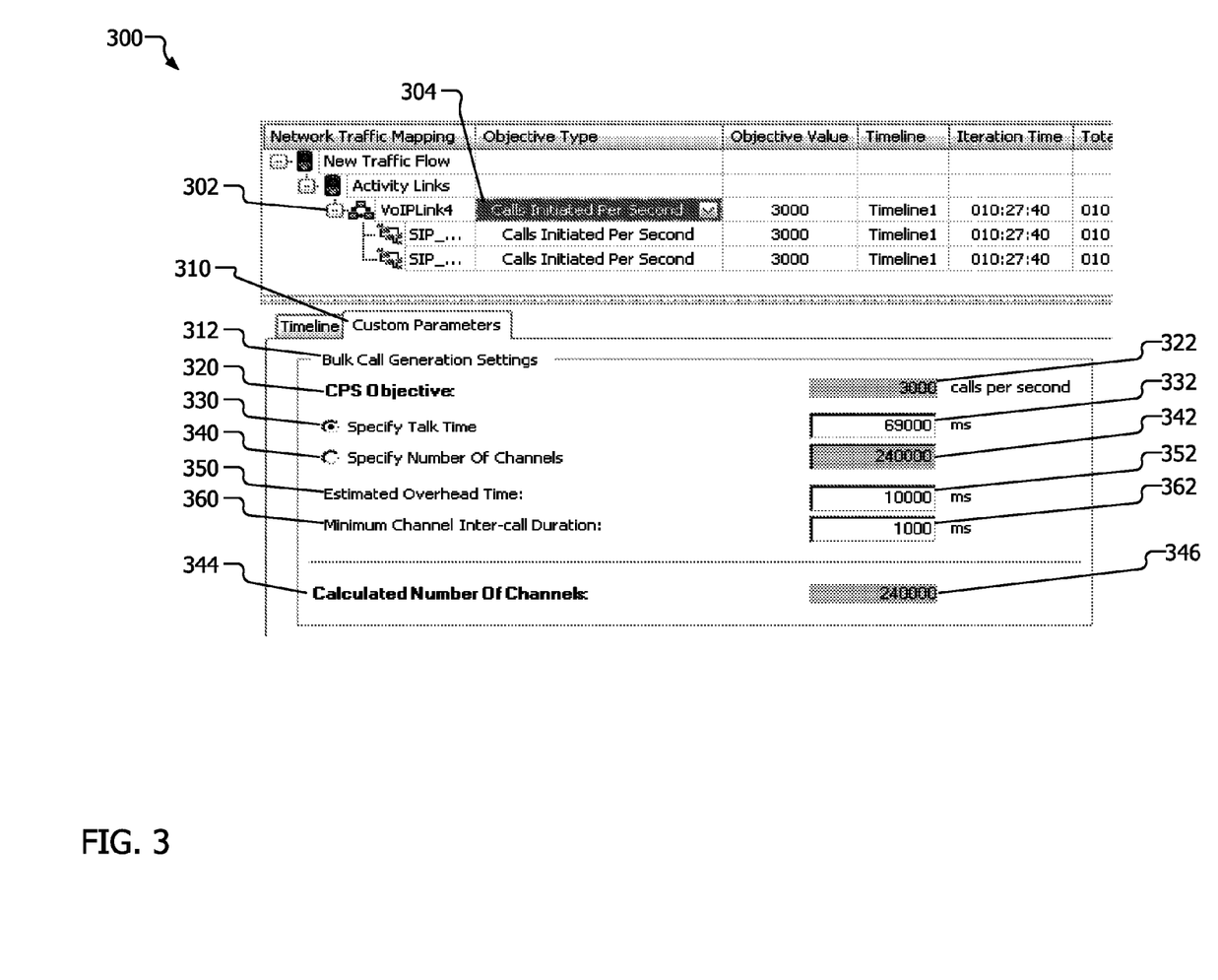
FIG. 3 is a screen shot of a graphical user interface provided to a user to achieve calls per second network testing.

The method described in FIG. 2 may be better understood by reviewing the screen shot 300 displayed in FIG. 3. Referring now to FIG. 3, there is shown a screen shot 300 of a graphical user interface provided to a user to achieve calls per second network testing like that described regarding FIG. 2. The network testing software provides a user interface that may be menu driven, and may include pull down menus, text entry boxes, radio buttons, check boxes and other graphical user interface items. Among various kinds of network tests, the user may select to prepare a test of VOIP calls by selecting VoIPLink 302 (see block 214 of FIG. 2). Associated with the VOIP test is a calls initiated per second objective 304. The calls initiated per second objective is a user specified whole number. Typical calls initiated per second objective values include 10, 25, 100, 1000, and others.

Returning now to a discussion of FIG. 2, in response to receiving a user selection to create a network test with bulk Internet telephone calls based on the number of calls initiated per second as shown in block 214 and receiving the number of calls to be initiated every second as shown in block 216, the network testing software provides a user interface allowing the user to specify criteria to create a network test with bulk Internet telephone calls, as shown in block 218. The criteria may be presented a custom properties pane 310 shown in FIG. 3. The custom properties pane 310 may be provided when a user clicks on, taps on or otherwise selects the call initiated per second objective 304.

Returning now to a discussion of FIG. 2, the network testing software provides the user the ability to select to enter information specifying the talk time or the number of channels, as shown in block 220. The user selects to proceed by specifying either talk time 230 or number of channels 240. In one embodiment, the user selects either talk time 230 or number of channels 240 by selecting a radio button such as radio buttons 330 and 340 shown in FIG. 3. Other ways of presenting this choice to the user and of receiving the user's selection may be used, including, check boxes, a slider, pull-down menu, and others. When the user elects to specify the talk time 230, the network testing software, receives the user specified talk time, as shown in block 232. This may be achieved by text entry field, pull down menu, or other user interface technique. The network testing software then calculates the number of voice channels based on the user (or system) specified number of calls per second and the user specified talk time, as shown in block 234. Alternatively, when the user elects to specify the number of channels 240, the network testing software, receives the user specified number of channels, as shown in block 242. This may be achieved by text entry field, pull down menu, or other user interface technique. The network testing software then calculates the talk time based on the user (or system) specified number of calls per second and the user specified number of voice channels, as shown in block 244.

After blocks 234 and 244, the user may specify additional test parameters not pertinent to the discussion herein and elect to begin the network test. The network testing software receives user selection to begin the network test, as shown in block 250. The network testing software begins transmitting packets for the network test, as shown in block 252. To keep the calls initiated per second objective without over-exceeding it, the network testing software regularly recalculates the calls to be generated per channel at a system defined interval to avoid bursts of calls, as shown in block 254. Bursts and over-transmission are kept near or to the user specified calls per second objective so as not to overflow or overwhelm the particular device under test that is the recipient of the calls (which may be another network testing system) or a pass-through of the call creation requests (such as, for example, a router, bridge, or switch).

In one embodiment, the network testing software attempts to keep the calls generated to not exceed a system defined or user specified threshold. The system defined or user specified threshold may be a percentage of the user specified call initiated per second objective. In one embodiment, the network testing software attempts to keep the calls generated to not exceed a system defined threshold of 102% of the user specified call initiated per second objective. In one embodiment, to keep the number of calls generated from creating an unintended burst, the system defined interval for recalculation is every 10 milliseconds. To maintain the precision of a 10 milliseconds timer in a single flow of execution (where all input/output events, state machine events and timer events are processed in a single flow), a lower level hardware signal may be used. The signal may be generated periodically at a 1 millisecond interval that updates a global timer. An event dispatching loop may check the global timer and preempts any activity gracefully so as to provide higher priority when required.

Referring now to the screen shot displayed in FIG. 3, in one embodiment, the user selects either talk time 230 or number of channels 240 by selecting a radio button such as radio buttons 330 and 340 shown in FIG. 3. When the user selects to specify the talk time 230 by selecting radio button 330, the user enters the talk time in a text entry field 332 provided by the network testing software. Similarly, when the user selects the number of channels radio button 340, the user enters the number of channels in a text entry field 342 provided by the network testing software. In this embodiment, when the user selects the specify talk time radio button 330, the text entry field for the number of channels 342 is greyed out to signify that the number of channels will be system calculated based on the user specified talk time and the calls initiated per second objective value. Similarly, when the user selects the specify the number of channels radio button 340, the text entry field for the specified talk time 332 is greyed out to signify that the talk time will be system calculated based on the user specified number of channels and the calls initiated per second objective value. When the user selects to specify the talk time (as shown in block 230, and by radio button 330), the network testing software prepares and displays the calculated number of channels (as shown in block 234) and provides the calculated number of channels via the user interface 300 by, in one embodiment, a text label 344 and the actual value 346 in custom parameters pane 310.

The user interface also allows the user to specify or the network testing software to display a system defined or computed default value for the estimated overhead time 350 and the maximum channel inter-call duration 360 in the bulk call generation settings pane 310, both of which are part of the call transmission criteria.

The example depicted in FIG. 3 shows a user or system specified calls per second objective 310 having a value 322 of 3,000 call per second. The examples shows the specify talk time radio button 330 selected with a user specified talk time value 332 of 69,000 milliseconds. Because the user elected the specify talk time radio button 330, the specify number of channel radio button 340 is unselected, the number of channels value area 342 is greyed out, and a system computed number of channels value of 240,000 is provided in the number of channels value area 342. In this example, the estimated time overhead 350 has a value of 10,000 milliseconds in the estimated overhead time value area 352, and the minimum channel inter-call duration 360 has a value of 1,000 milliseconds in the minimum channel inter-call duration value area 362. The calculated number of channels 344 is show in the calculated number of channels value area 346 as 240,000, which is also provided in the greyed out specify number of channel value area 342.

Depending on the user specified network test and the configuration of the hardware devices in the specific test environment, the same network testing system that transmits packets may receive, process and analyze the packets sent in the network test. In some configurations, a second network testing system may receive the packets that initiated from a network test on a first network testing system.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A network testing system having at least one network card, the network card including a processor, a memory and a network communications unit, the network testing system coupled with a network, the network testing system having instructions stored thereon which when executed cause the network testing system to perform operations comprising:
   receiving user selection to create a network test
   receiving user specification of a test type as bulk network calls
   receiving user specification of the call transmission criteria for the network test, the call transmission criteria including a number of calls per second and one of either a talk time or a number of channels such that
       when the talk time is specified, calculating the number of channels, and
       when the number of channels is specified, calculating the talk time
   receiving user selection to begin the network test
   transmitting packets for the network test according to the call transmission criteria
   recalculating the call transmission criteria at a system defined interval to avoid bursts.

2. The network testing system of claim 1 wherein the system defined interval for recalculating is a number in the range of 1 millisecond to 10,000 milliseconds.

3. The network testing system of claim 1 wherein the system defined interval for recalculating is a number in the range of 0.01 milliseconds to 100 milliseconds.

4. The network testing system of claim 1 wherein the call transmission criteria further include an estimated overhead time and a minimum inter-call duration.

5. The network testing system of claim 1 wherein the burst is a system defined threshold of a percentage of the user specified calls per second, wherein the percentage is a value in a range from 100% to 120%.

6. A computing device including a processor, a memory and a network communications unit, the computing device coupled with a network, the computing device having instructions stored thereon which when executed cause the computing device to perform operations comprising:
   receiving user selection to create a network test
   receiving user specification of a test type as bulk network calls
   receiving user specification of the call transmission criteria for the network test, the call transmission criteria including a number of calls per second and one of either a talk time or a number of channels such that
       when the talk time is specified, calculating the number of channels, and
       when the number of channels is specified, calculating the talk time
   receiving user selection to begin the network test
   transmitting packets for the network test according to the call transmission criteria
   recalculating the call transmission criteria at a system defined interval to avoid bursts.

7. The computing device of claim 6 wherein the system defined interval for recalculating is in the range of from 1 millisecond to 10,000 milliseconds.

8. The computing device of claim 6 wherein the system defined interval for recalculating is a number in the range of 0.01 milliseconds to 100 milliseconds.

9. The computing device of claim 6 wherein the call transmission criteria further include an estimated overhead time and a minimum inter-call duration.

10. The computing device of claim 6 wherein the burst is a system defined threshold of a percentage of the user specified calls per second, wherein the percentage is a value in a range from 100% to 120%.

11. A method for specifying and executing a network test, the method implemented by software stored on a computing device including a processor, a memory and a network communications unit, the computing device coupled with a network, the computing device having instructions stored thereon which when executed cause the computing device to perform the method comprising:
- receiving user selection to create the network test
- receiving user specification of a test type as bulk network calls
- receiving user specification of the call transmission criteria for the network test, the call transmission criteria including a number of calls per second and one of either a talk time or a number of channels such that
  - when the talk time is specified, calculating the number of channels, and
  - when the number of channels is specified, calculating the talk time
- receiving user selection to begin the network test
- transmitting packets for the network test according to the call transmission criteria
- recalculating the call transmission criteria at a system defined interval to avoid bursts.

12. The method of claim 11 wherein the system defined interval for recalculating is in the range of 1 millisecond to 10,000 milliseconds.

13. The method of claim 11 wherein the system defined interval for recalculating is a number in the range of 0.01 milliseconds to 100 milliseconds.

14. The method of claim 11 wherein the call transmission criteria further include an estimated overhead time and a minimum inter-call duration.

15. The method of claim 11 wherein the burst is a system defined threshold of a percentage of the user specified calls per second, wherein the percentage is a value in a range from 100% to 120%.

16. A computer readable storage medium having instructions stored thereon which when executed cause a network testing system to perform actions comprising:
- receiving user selection to create the network test
- receiving user specification of a test type as bulk network calls
- receiving user specification of the call transmission criteria for the network test, the call transmission criteria including a number of calls per second and one of either a talk time or a number of channels such that
  - when the talk time is specified, calculating the number of channels, and
  - when the number of channels is specified, calculating the talk time
- receiving user selection to begin the network test
- transmitting packets for the network test according to the call transmission criteria
- recalculating the call transmission criteria at a system defined interval to avoid bursts.

17. The computer readable storage medium of claim 16 wherein the system defined interval for recalculating is in the range of 1 millisecond to 10,000 milliseconds.

18. The computer readable storage medium of claim 16 wherein the system defined interval for recalculating is a number in the range of 0.01 milliseconds to 100 milliseconds.

19. The computer readable storage medium of claim 16 wherein the call transmission criteria further include an estimated overhead time and a minimum inter-call duration.

20. The computer readable storage medium of claim 16 wherein the burst is a system defined threshold of a percentage of the user specified calls per second, wherein the percentage is a value in a range from 100% to 120%.

* * * * *